United States Patent [19]
Thomas

[11] 3,829,174
[45] Aug. 13, 1974

[54] GANG PLATE FASTENING ASSEMBLY AND ENDLESS TRACK FORMED THEREWITH
[75] Inventor: Ian A. Thomas, Calgary, Alberta, Canada
[73] Assignee: Flextac Nodwell Ltd., Calgary, Alberta, Canada
[22] Filed: Oct. 29, 1973
[21] Appl. No.: 410,421

[52] U.S. Cl............................. 305/35 EB, 305/54
[51] Int. Cl............................................ B62m 27/02
[58] Field of Search ............ 305/35 EB, 38, 54, 55

[56] References Cited
UNITED STATES PATENTS
| | | | |
|---|---|---|---|
| 1,536,604 | 5/1925 | Bentson | 305/54 |
| 2,749,189 | 6/1956 | France | 305/35 EB |
| 3,165,364 | 1/1965 | Hardman | 305/35 EB X |
| 3,390,924 | 7/1968 | Brumbaugh | 305/54 |
| 3,561,825 | 2/1971 | Gibson | 305/35 EB |
| 3,610,708 | 10/1971 | Muecke | 305/35 EB |

*Primary Examiner*—Richard J. Johnson
*Attorney, Agent, or Firm*—Fisher, Christen & Sabol

[57] ABSTRACT

A gang plate fastening assembly particularly conceived to be used to inexpensively and readily secure grouser bars of aluminum extrusion to form endless tracks for tracked vehicles, but which may also be used to secure other members having an appropriate elongated passage therein. The grouser bar and gang plate fastening assembly includes a grouser bar having an elongated passage, a groove along the latter forming opposite faces adapted to non-rotatably restrain nuts in the groove, and a gang plate engaged into the elongated passage merely holding a shoulder portion of the nuts such that the latter are in predetermined spaced apart relationship and in registry with a row of bolt receiving bores along the grouser bar.

11 Claims, 7 Drawing Figures

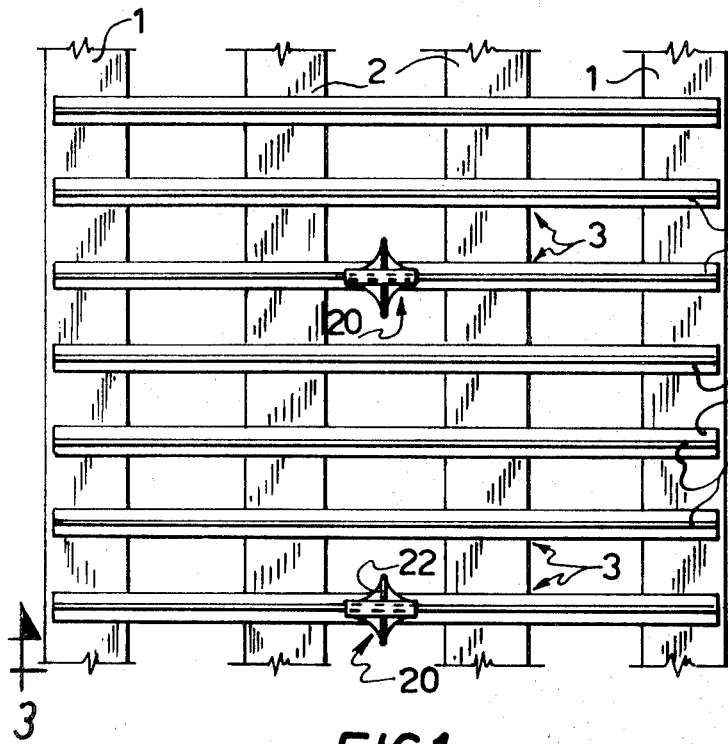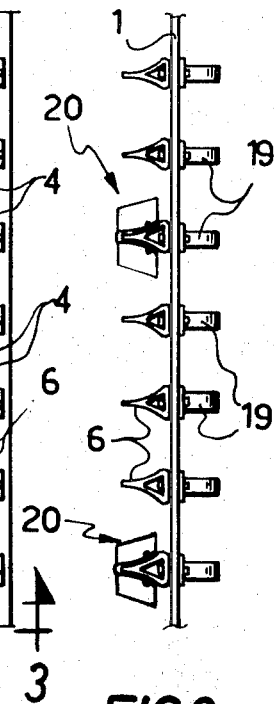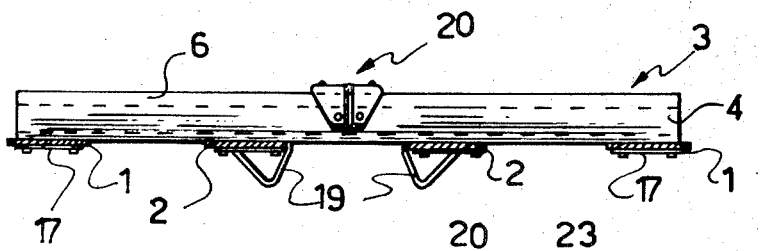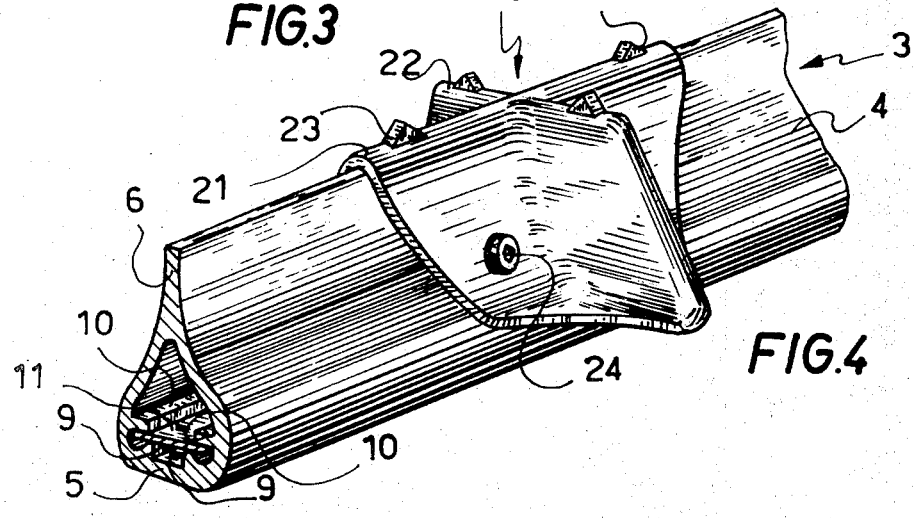

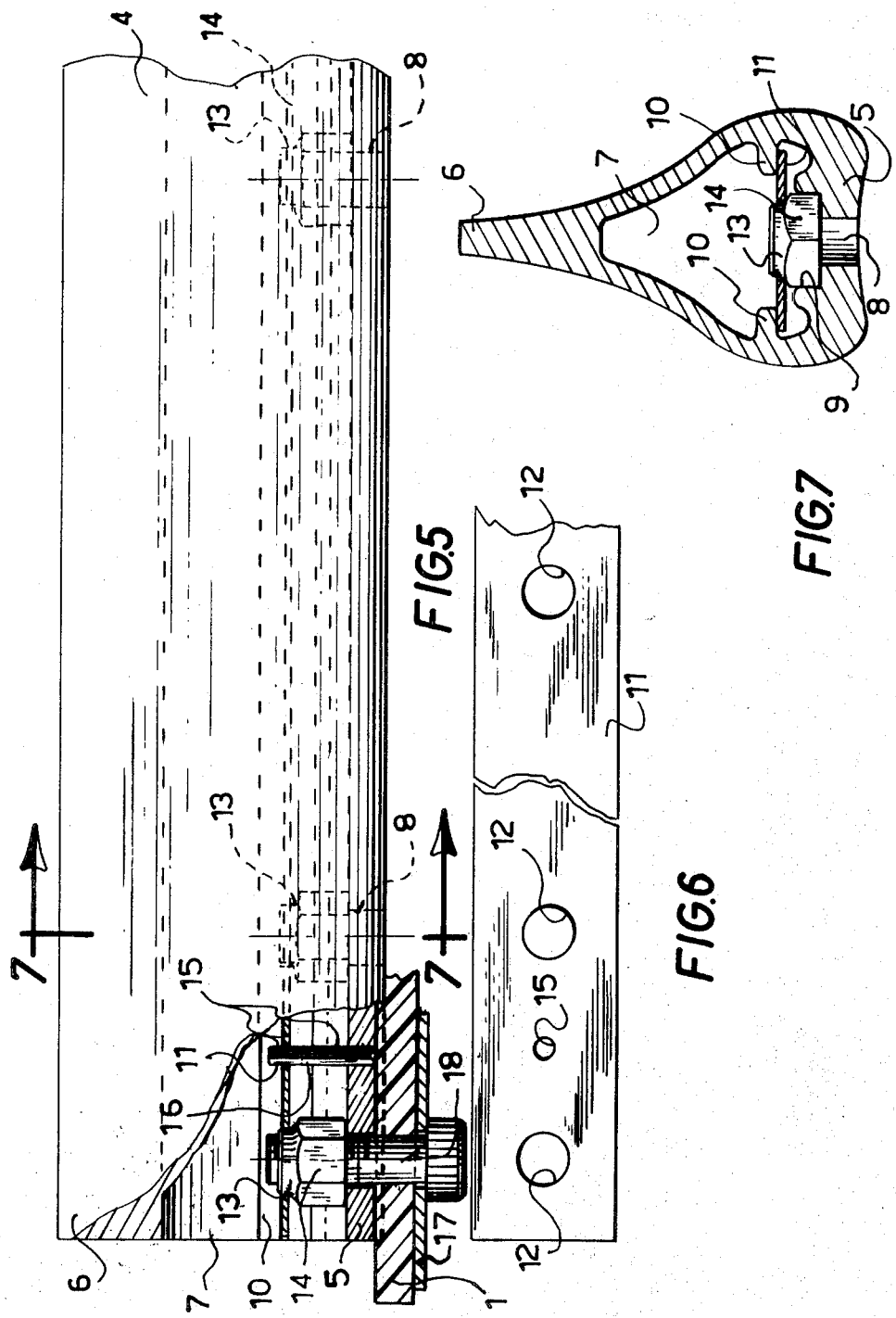

GANG PLATE FASTENING ASSEMBLY AND ENDLESS TRACK FORMED THEREWITH

This invention relates to a gang plate fastening assembly, and in particular, to grouser bar and gang plate fastening assemblies and endless tracks formed therewith.

It is well known to use gang plates, that is, nuts locating plates, to assist in fastening members together. The gang plates which have been known so far are either adapted to non-rotatably hold independent nuts or have the latter integrally formed therewith or fixedly secured thereto. In both of these instances, the gang plates must be sufficiently strong to resist the strain imposed thereon by the nuts upon screwing and unscrewing bolts into the latter. Besides, the cost of manufacture of such gang plates is relatively high and the latter are not adapted to be conveniently and readily made on the spot to be readily adapted to any particular application.

For the lightest tracked vehicles, the endless track is now commonly assembled using grouser bars made of aluminum extrusion some 36 to 42 inches long. So far, such grouser bars of extruded aluminum have been bolted in substantially conventional manner. This has been found inconvenient. Furthermore, the use of the conventional gang plates has also been found unsuitable for such application due to the above mentioned limitations thereof.

It is a general object of the invention to provide a gang plate fastening assembly which is particularly adapted to fasten the grouser bars of aluminum extrusion to endless belts and to fasten as well other members each having a longitudinal passage therein, in a practical and economical manner avoiding the aforementioned limitations of the gang plates of the prior art.

It is a more specific object of the invention to provide an endless track for a tracked vehicle which track is formed with grouser bar and gang plate fastening assemblies particularly adapted to produce a relatively inexpensive construction using gang plates which may be readily and conveniently formed on the spot, with the desired length and holes to thus suit any particular grouser bar application.

It is another object of the invention to provide a gang plate fastening assembly wherein the gang plate has not to be adapted to resist rotation of the nuts and which therefore need not have any particular strength and which besides may be readily and inexpensively made from a thin strip or plate.

It is a further object of the invention to provide a member or grouser bar to be fastened with mutually facing faces adapted to hold the nuts against rotation and a gang plate in cooperation with such faces to merely provide positioning of the nuts along the latter.

The above and other objects and advantages of the invention will be better understood in the light of the following detailed description of a preferred embodiment thereof which is illustrated by way of example only, in the accompanying drawings, in which:

FIG. 1 is a plan view of a section of an endless track for a tracked vehicle having grouser bars secured according to the present invention.

FIG. 2 is a side view of the section of endless track as seen from the right in FIG. 1.

FIG. 3 is a transverse cross-sectional view as seen along line 3—3 of FIG. 1.

FIG. 4 is a partial detailed view in perspective showing the central portion of a grouser bar with a cleat thereon according to the present invention.

FIG. 5 is a partial enlarged view of FIG. 3, with parts broken away to show the cooperative relationship of a bolt and lock pin therewith.

FIG. 6 is a partial plan view of a gang plate or strip according to the present invention.

FIG. 7 is a cross-sectional view as seen along line 7—7 in FIG. 5.

The illustrated grouser bar and gang plate fastening assemblies are particularly shown in combination to form an endless track for a tracked vehicle. It will be better understood as the detailed description proceeds, that the invention is applicable to the fastneing of grouser bars and to the fastening of other members of suitable construction.

The illustrated endless track includes four endless belts 1,1 and 2,2 to which are secured a plurality of grouser bar and gang plate assemblies 3. Each grouser bar and gang plate assembly 3 includes a grouser bar 4 formed of an aluminum extrusion having a root or base portion 5 and a ground engaging blade portion 6 on opposite sides respectively of the grouser bar 4 and of a longitudinal passage 7 extending from end to end of the latter. A row of bores 8 extend through the root portion 5 toward the blade portion 6, communicate with the longitudinal space 7, and are adapted to insert bolts therethrough. The bores 8 are arranged in predetermined spaced apart relationship along each grouser bar 4 and such that a pair of such holes register with each endless belt 1 or 2, at each grouser bar.

A channel or groove is formed into the root portion 5 of each grouser bar 4 in communication with the row of bores 8 and the elongated passage 7. The above groove defines a pair of spaced apart and mutually facing parallel reference faces 9 extending on opposite sides respectively of the row of bores 8 and parallel to the latter. A pair of ribs 10 project into the longitudinal passage along opposite sides respectively of the above groove and are spaced from the latter toward the blade portion 6. The free edge of the ribs 10 are spaced apart from each other to allow the inner end of bolts to pass between them.

An elongated gang plate or strip 11 is provided and has a row of apertures or holes 12 formed therethrough and arranged along the same into the aforementioned spaced apart relationship of the bores 8 to register with the latter when the gang plate 11 is properly inserted between the root portion 5 and the ribs 10. The holes 12 are adapted to each receive the shoulder portion 13 of a shouldered or crown nut 14. A pair of holes or bores 15 are also formed at a longitudinally predetermined location of the root portion 5 and gang plate 11 respectively to register with each other and thus define the proper longitudinal positioning of the elongated gang plate 11 relative to the grouser bar 4; that is, the positioning of the gang plate 11 which results in registry of the holes 12 with the bores 8. A roll pin 16 is inserted into the pair of aligned or registering holes 15 to lock the gang plate 11 into the aforementioned proper positioning thereof.

A grouser bar and gang plate assembly is formed by inserting the strip or elongated plate endwise between the root portion 5 and the ribs 10 with the required number of shouldered nuts 14 engaged into the longitudinally locating holes 12. Two opposite faces of each nut 14 slide along the reference faces 9 respectively. When the gang plate 11 has been properly inserted, the holes 15 register with each other and the roll pin 16 is inserted locking the gang plate in that position which defines registry of the holes 12 with the bores 8 respectively.

The grouser bar and gang plate fastening assembly is thus positioned transversely of the belts 1,1 and 2,2 with the root portion 5 engaging against one face of the latter and aligned with appropriate holes through the same. A backing plate 17 is positioned against the other face of each belt 1 and 2 in registry with each grouser bar 4. A bolt 18 is then inserted through each pair of registering bore 8 and hole 12 and is screwed into the corresponding nut 14 which is held against rotation by the engagement of the aforementioned opposite faces thereof with the reference faces 9. In properly fastened position, the head of the bolt 18 abuts against the backing plate 17 sandwiching the corresponding belt 1 or 2 between the latter and the corresponding grouser bar 4.

A pair of wheel guides 19 of any appropriate construction are secured against that other face of the endless belts 2,2 in registry with each grouser bar 4 to define a wheel path intermediate these endless belts.

A cleat 20 formed from a steel casting is secured onto the blade portion 6 of every fourth grouser bar 4. The cleat 20 includes a ridge 21 engaging over the blade portion 6 and a ridge 22 extending crosswise of the ridge 21 and of the grouser bar. Studs 23 project outwardly of the ridge 21 and are made of suitable material to constitute ice cleats. The cleat 20 is secured to the blade portion 6 by bolts 24 extending transversely into the latter and the ridge 21.

It must be noted that although the invention finds particularly useful application in the construction of endless tracks for tracked vehicles, the principle of the invention is also applicable to fasten other members which would have the necessary elongated passage for a gang plate and the nuts. For instance, such members to be secured, or at least the passage therein, could be arc-shaped and a gang plate of complementary shape could still be inserted to hold the nuts.

What I claim is:

1. A gang plate fastening assembly comprising a member having an elongated passage extending therein from one face thereof, and a plurality of apertures projecting therethrough and transversely communicating with said elongated passage at predetermined spaced apart relationship along the latter, said member forming a groove into said elongated passage defining a pair of reference faces extending in spaced apart and mutually facing parallel relationship on opposite sides respectively of said apertures, a pair of shoulders extending into said elongated passage along opposite sides respectively of said groove and spaced from the latter, and an elongated gang plate engageable lengthwise between said groove and said shoulders and having a plurality of holes therethrough arranged into said predetermined spaced apart relationship along the same, to register with said plurality of apertures, and to longitudinally locate nuts therein in non-rotatable engagement with said pair of reference faces whereby to allow fastening of said member by bolts engaging through said apertures and into said nuts.

2. A gang plate fastening assembly as defined in claim 1, wherein said elongated member constitutes a grouser bar for the endless track of a tracked vehicle and said elongated passage extends from end to end of said grouser bar.

3. A gang plate fastening assembly as defined in claim 2, wherein said grouser bar includes a ground engaging blade portion and a root portion extending lengthwise thereof on transversely opposite sides of said elongated passage, and said plurality of apertures project inwardly through said root portion transversely toward said blade portion.

4. A gang plate fastening assembly for grouser bar as defined in claim 3, wherein said grouser bar is formed from an aluminum extrusion integrally having said pair of shoulders formed therewith.

5. A gang plate fastening assembly as defined in claim 4, wherein said aluminum extrusion includes internal ribs projecting lengthwise thereof on opposite sides of said apertures and forming said pair of shoulders.

6. A gang plate fastening assembly as defined in claim 5, wherein said elongated gang plate includes a thin strip having said plurality of holes punched therethrough and arranged to locationally engage a shoulder portion of said nuts therein.

7. A gang plate fastening assembly as defined in claim 6, further including a roll pin engaging through said root portion and said gang plate and arranged to lock the latter together against relative lengthwise displacement.

8. A gang plate fastening assembly as defined in claim 1, further including positioning means constructed and arranged to longitudinally lock said gang plate against lengthwise displacement from the position of registry of said holes with said apertures.

9. A gang plate fastening assembly as defined in claim 8, wherein said positioning means includes a roll pin engaging through said elongated member and said elongated gang plate.

10. An endless track for a tracked vehicle comprising endless belts extending lengthwise of each other in laterally spaced apart relationship, a plurality of grouser bar and gang plate fastening assemblies secured to said endless belts, each of said grouser bar and gang plate fastening assemblies including a grouser bar formed of aluminum extrusion having a root portion resting on one face of said belts, a ground engaging blade portion arranged transversely opposite to said root portion, a longitudinal passage extending from end to end of said grouser bar, a row of bores projecting through said root portion communicating with said elongated passage, and registering with said endless belts in predetermined spaced apart relationship, a groove formed into said root portion extending lengthwise thereof in communication with said longitudinal passage and said bores and defining a pair of reference faces extending in spaced apart and mutually facing parallel relationship on opposite sides respectively of said row of bores and parallel to the latter, a pair of ribs projecting into said longitudinal passage along opposite sides respectively of said groove and spaced from the latter toward said blade portion, an elongated gang plate engaged between said groove and said ribs and having a row of holes therethrough arranged into said predetermined spaced apart relationship along the same, in registry with said row of bores and with said belts, a roll pin engaged through said root portion and said gang plate and adapted to longitudinally lock the latter relative to said grouser bar, a plurality of shouldered nuts each having a shoulder portion engaged into one of said holes and having opposite flat faces slidably engaged between said opposite reference faces and non-rotatably restrained by the latter, and a plurality of bolts projecting through said belts, said bores, and said holes and screwed into said nuts.

11. An endless track for a tracked vehicle as defined in claim 10, further including backing plates arranged into registry with said grouser bars against the other face of said belts for abutting engagement of said bolts therethrough, and at least one cleat device secured to the blade portion of some of said grouser bars.

* * * * *